FREQUENCY SYNTHESIZER SYSTEM FOR GENERATING SIGNALS
HAVING FREQUENCIES OVER A WIDE BAND OF FREQUENCIES
ALL OF WHICH ARE PHASE COHERENT WITH
FREQUENCY STANDARD SIGNALS

Filed Sept. 9, 1966 4 Sheets-Sheet 1

INVENTOR.
RAYMOND J. ROGERS
ERNEST W. HUGHES
BY M. LaKache ATTY.

INVENTERS:
RAYMOND J. ROGERS
ERNEST W. HUGHES
BY M. Lukacher ATTY

March 5, 1968 R. J. ROGERS ET AL 3,372,346

FREQUENCY SYNTHESIZER SYSTEM FOR GENERATING SIGNALS HAVING FREQUENCIES OVER A WIDE BAND OF FREQUENCIES ALL OF WHICH ARE PHASE COHERENT WITH FREQUENCY STANDARD SIGNALS

Filed Sept. 9, 1966

4 Sheets-Sheet 3

INVENTERS
RAYMOND J. ROGERS
ERNEST W. HUGHES
BY M. L. Kade ATTY

FREQUENCY SYNTHESIZER SYSTEM FOR GENERATING SIGNALS HAVING FREQUENCIES OVER A WIDE BAND OF FREQUENCIES ALL OF WHICH ARE PHASE COHERENT WITH FREQUENCY STANDARD SIGNALS

Filed Sept. 9, 1966

4 Sheets-Sheet 4

INVENTERS
RAYMOND J. ROGERS
ERNEST W. HUGHES,

BY M. [signature] ATTY

United States Patent Office 3,372,346

Patented Mar. 5, 1968

3,372,346

FREQUENCY SYNTHESIZER SYSTEM FOR GENERATING SIGNALS HAVING FREQUENCIES OVER A WIDE BAND OF FREQUENCIES ALL OF WHICH ARE PHASE COHERENT WITH FREQUENCY STANDARD SIGNALS

Raymond J. Rogers, Rochester, N.Y., and Ernest W. Hughes, Ft. Wayne, Ind., assignors to General Dynamics Corporation, a corporation of Delaware Filed Sept. 9, 1966, Ser. No. 578,338
9 Claims. (Cl. 331—2)

ABSTRACT OF THE DISCLOSURE

A frequency synthesizer system is described which produces signals over a band from 2–76 mc./s. all coherent with frequency standard signals. The synthesizer includes two channels which generate signals and apply them to an output mixer. The output mixer drives an output phase locked loop which follows the selected output mixer product. The output phase locked loop produces injection frequency signals for the mixer stages of a radio. Each of the channels includes phase locked loops which are locked by spectrum components obtained from the frequency standard. The input to one of the channels is a frequency stable component obtained from the spectrum which has a frequency of about 17 mc./s. A preset divider phase locked loop, which is locked by a frequency stable signal from the standard, generates signals which may be varied in 1 kc. or smaller steps. The preset divider phase locked loop signal is translated into the 17 mc./s. range and then further translated by the output of the other phase locked loop in the second channel so as to provide an input to the output mixer.

The present invention relates to frequency synthesizer systems and particularly to a frequency synthesizer for use in a radio system.

The invention is especially adapted for use in a single sideband radio system which is operative over a wide band of frequencies, including the high frequency band and portions of the very high frequency band. The invention is, of course, generally useful for the generation of signals of selected frequencies separated by discrete frequency steps.

Frequency synthesizers may be defined as signal generators which are controllable to generate signals of different frequencies. These frequencies should be precise so that they do not drift or vary materially from time to time. In order to accomplish these objectives, synthesizers have used frequency standards, such as crystal oscillators. Since such oscillators are limited to a single frequency, complex frequency translation schemes have been evolved. These schemes have not, without introducing complexities, been capable of generating frequencies variable continuously in steps over a significantly wide band. Thus, single sideband radios have generally been limited to a small number of frequency channels or have been costly.

It is therefore an object of the present invention to provide an improved frequency synthesizer for generating signals over a continuous wide band of frequencies which are separated by discrete frequency steps and which are coherent (viz, locked to the same frequency standard).

It is another object of the present invention to provide an improved frequency synthesizer which is adapted for use in a single sideband radio, operable over a wide band of frequencies including the high frequency and substantial portions of the very high frequency band.

It is a still further object of the present invention to provide an improved wide range frequency synthesizer which is less complex and costly than known synthesizers which can operate over a comparable wide band.

It is a still further object of the present invention to provide an improved wide range synthesizer which is capable of generating signals at frequencies separated by very small frequency steps, such as ten cycles per second.

Briefly described, a frequency synthesizer system embodying the invention includes a frequency standard, the output of which, as by frequency spectrum generation, provides a plurality of frequency stable signals. A first channel and a second channel are provided, each containing a separate phase locked loop. The first channel phase locked loop contains a variable frequency oscillator which may be locked to produce a plurality of selected frequencies in response to a frequency stable signal applied to the loop. The second channel phase locked loop also contains a variable frequency oscillator which is output connected to a counter which is in turn connected to a phase detector responsive to a frequency stable locking signal. The synthesizer controls are operative to change the maximum count (viz, the dividing ratio) of the counter so that the phase detector derives error voltages which vary the oscillator frequency in discrete frequency steps in accordance with the dividing ratio. The second channel also includes frequency translation means for translating the second channel phase locked loop oscillator output into a second channel output signal. The second channel translation means may include another phase locked loop containing a variable frequency oscillator which provides output signals of selected frequencies; the loop being locked by a frequency stable signal. The first channel output signal and the second channel output signal are mixed to provide the synthesizer output. Common controls, such as knobs which select the frequency in discrete decade steps, e.g., 10 mc./s. steps, 1 mc./s. steps, 100 kc./s. steps, 10 kc./s. steps and 1 kc./s. steps, may be used conjointly to control the phase locked loop oscillators and the counter for digitally tuning the synthesizer. Another phase locked loop, locked by the synthesizer output signal, may be used to provide a final synthesizer output signal. Inasmuch as all of the phase locked loop oscillators are locked to the frequency stable signals produced by the standard, the synthesizer produces coherent signals free from spurious frequency components. These signals may be applied to the frequency conversion stages of a single sideband radio receiver so as to develop intermediate frequency signals on reception of radio frequency output signals or to generate radio frequency signals for transmission.

The invention itself, both as to its organization and method of operation, as well as additional objects and advantages thereof will become more readily apparent from a reading of the following description in connection with the accompanying drawings in which.

Figure 1:
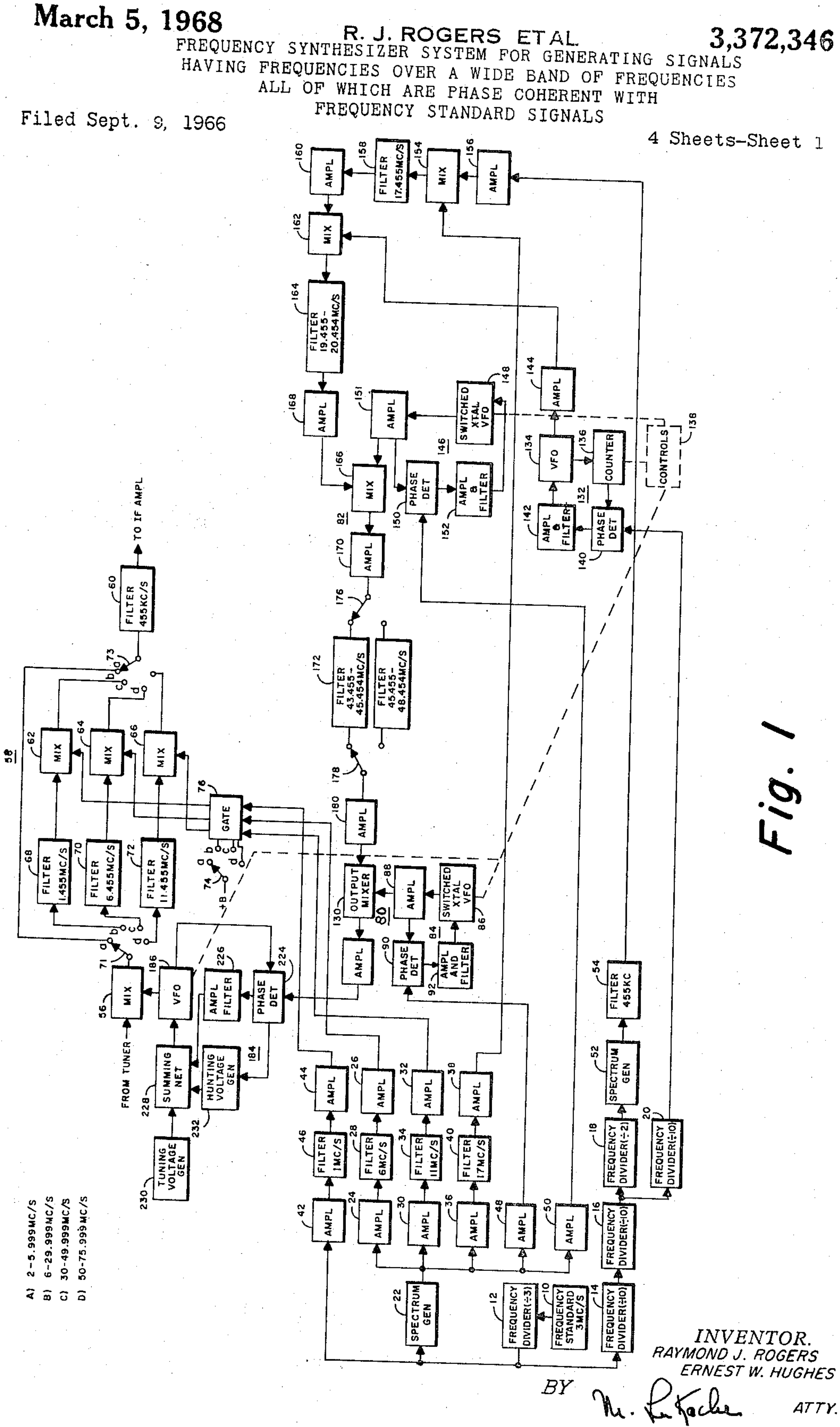
FIG. 1 is a simplified block diagram of a frequency synthesizer as used in a radio set, the synthesizer embodying the features of the invention.

Referring to FIG. 1, a frequency standard 10, which may be a crystal oscillator contained in a temperature controlled oven or a temperature compensated crystal oscillator provides a frequency stable output signal to a chain of frequency dividers 12, 14, 16, 18 and 20. These frequency dividers may be chains of flip-flops, and the frequency standard may include pulse forming circuitry which provides pulses for application to the first of these dividers 12. The first divider 12 divides by three, in the illustrated embodiment of the invention where the frequency standard is considered to have an output frequency of 3 mc./s. Accordingly, the divider 12 provides an output frequency of 1 mc./s. The divider 14, which is a decade divider, provides an output signal of 100 kc./s., and the divider 16, also a decade divider, provides an output frequency of 10 kc./s. The other divider 20, also a decade divider, provides an output divider of 1 kc./s. The divider 18, which may be a flip-flop which divides by two, provides an output signal of 5 kc./s.

A spectrum generator 22, which may be a keyed, tuned amplifier controlled by the 1 mc./s. pulses, produces a spectrum of signals separated by 1 mc./s. steps. From this spectrum signals of 6 mc./s., 11 mc./s. and 17 mc./s. are extracted by means of amplifiers and filters. The 6 mc./s. signal is derived by a pair of isolation amplifiers 24 and 26, separated by a 6 mc./s. filter 28. Similarly, the 11 mc./s. signal is extracted by a pair of isolation amplifiers 30 and 32, separated by an 11 mc./s. filter 34. The 17 mc./s. signal is extracted by a pair of isolation amplifiers 36 and 38, separated by a 17 mc./s. filter 40. The filters and amplifiers also derive these 6, 11 and 17 mc./s. signals in sinusoidal form for frequency translation purposes, as will hereinafter become apparent.

A 1 mc./s. signal is derived directly from the output of the divider 12 by means of a pair of isolation amplifiers 42 and 44, separated by a 1 mc./s. filter 46. The 1 mc./s. spectrum components are frequency stable signals used in the synthesizer and are available at the outputs of isolation amplifiers 48 and 50.

Another spectrum generator 52, similar to the generator 22, receives the 5 kc./s. signal from the divider 18 and develops a spectrum of components separated by 5 kc./s. steps. A component having a frequency equal to the intermediate frequency of the radio set in which the synthesizer is used, is extracted by means of a filter 54. This intermediate frequency is 455 kc./s., which corresponds to the frequency passed by the filter.

The frequency translation stage of the radio set in which the synthesizer is used is also shown in FIG. 1 and is a double conversion translation stage, including a first mixer 56 and a group of second mixers 58. The second mixers 58 are connected to the first mixers and to an output filter 60, selectively by means of switches 71 and 73 which may be ganged together. These switches select four bands, indicated as (*a*), (*b*), (*c*) and (*d*), the frequency ranges of which are indicated solely for purposes of illustration on the drawing. A direct connection from the first mixer 56 to the output filter 60 is provided by the switches when set for band (*a*). The output filter 60 derives the intermediate frequency output which in the instant illustrated case is 455 kc./s. Three mixers, 62, 64 and 66, are included in the second mixer group. The mixer 62 is selected when the switches 71 and 73 select the (*b*) band, which has an intermediate frequency of 1.455 mc./s. A 1.455 mc./s. filter 68 connects the mixer 56 to the mixer 62. The (*c*) and (*d*) bands have intermediate frequencies of 6.455 mc./s. and 11.455 mc./s., respectively. These are selected by mixer interconnecting filters 70 and 72.

The intermediate frequencies of 1.455, 6.455 and 11.455 mc./s. are translated in the mixers 62, 64 and 66 to the output intermediate frequency of 455 kc./s. by means of the 1 mc./s., 6 mc./s. and 11 mc./s. frequency stable signals. A selector switch 74, which may be ganged with the switches 71 and 73 in the translator stage, applies enabling potentials to a gate circuit 76 so as to enable one of the 1 mc./s., 6 mc./s. and 11 mc./s. signals to be applied to their respective mixers 62, 64 and 66.

The synthesizer itself includes a pair of synthesizing channels 80 and 82, the frequencies generated in which are independently locked by means of frequency stable signals derived by the frequency standard 10. In the case of the first channel 80, a phase locked loop 84 selectively generates a plurality of locked signals. In the illustrated embodiment, these signals may have frequencies of 4, 8, 17, 21, 25, 29, 33, 37 and 41 mc./s. The loop 84 contains a switched crystal variable frequency oscillator 86, which will be described in greater detail in connection with FIG. 2. The output of this variable frequency oscillator (VFO) is applied to an isolation amplifier 88. The amplifier may have two emitter/follower output stages which provide two output signals. One of these output signals is used in the loop 84 and is applied to a phase detector 90. The phase detector 90 also receives a spectrum or 1 mc./s. frequency components from the amplifier 48. Inasmuch as the VFO 86 produces output signals which are integral multiples of 1 mc./s., these output signals are phase locked to their corresponding spectrum components by reason of the operation of the phase detector 90. The phase detector 90 provides an error signal which is amplified and filtered in a direct current amplifier and low pass filter stage 92. This stage 92 thus provides a direct current error signal which is used in the variable frequency oscillator to vary its frequency until it is locked to the proper 1 mc./s. spectrum component.

Figure 2:
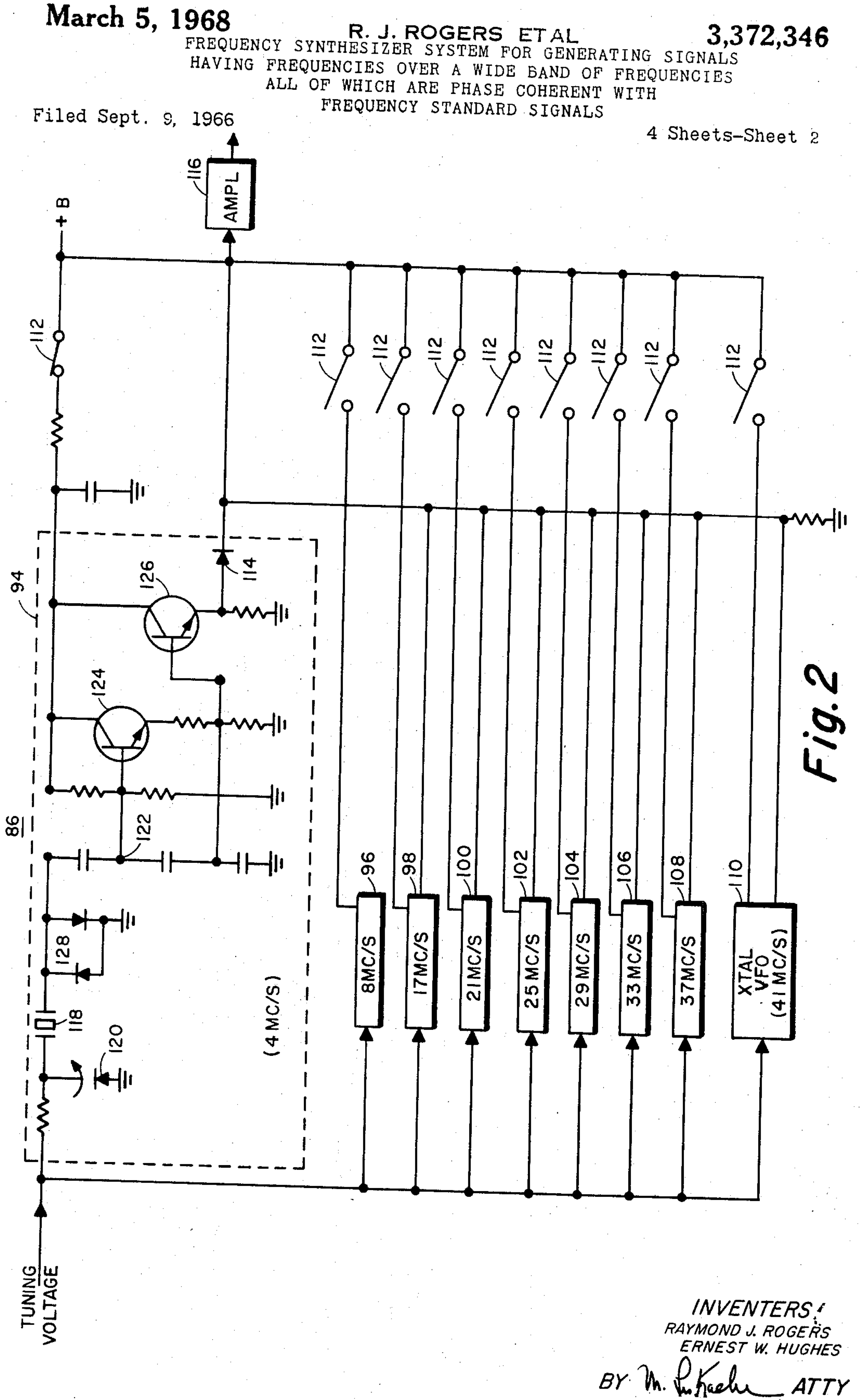
FIG. 2 is a schematic diagram, partially in block form and partially in schematic form, which illustrates the first channel variable frequency oscillator.

Referring now to FIG. 2, it will be observed that the variable frequency oscillator 86 includes a plurality of parallel connected oscillator stages, 94, 96, 98, 100, 102, 104, 106, 108 and 110, each of which is similar in construction. Thus, only the stage 94, which produces the 4 mc./s. signal, is shown in detail. The oscillator has a common input connection for tuning voltage, which is applied thereto from the output of the amplifier and filter stage 92. A common source of operating voltage is also connected selectively to these stages by way of switches 112. The selected switch, when closed, provides operating potential to only one of the stages (e.g. the stage 94, as shown). The other stages are then not operative. A diode 114 in the output of each stage prevents output signals from the operative stage from being introduced into the inoperative stages. All of the stages have a common output which is derived therefrom and applied to an output amplifier 116 which may be an emitter/follower. This amplifier is then connected to the amplifier 88 in the phase locked loop.

The stage 94 includes a frequency-determining circuit having a crystal 118 which is tuned to 4 mc./s. This crystal 118 is connected to a variable capacity diode 120 to which the tuning voltage is applied. The crystal and diode are effectively connected across the tank and capacitors 122 of a Pierce (Colpitts type) oscillator, including the transistor 124. The output of this transistor oscillator is applied to an emitter/follower amplifier, including another transistor 126 and is transmitted through the isolating diode 114 to the output amplifier 116. A pair of clipping diodes 128 are included in the tank circuit for controlling the amplitude of the oscillations produced by the oscillator 124.

Returning to FIG. 1, the amplifier 88 in the phase locked loop provides a first output signal which is the first channel output. This signal is applied to an output mixer 130. This output mixer, as is the case for all of the mixers mentioned heretofore, and which will be mentioned hereinafter, may be balanced mixers such as may be provided by a diode bridge circuit wherein the signals to be mixed are applied across opposite diagonals of the bridge circuit.

The second channel 82 includes a first phase locked loop 132 which is locked by the 1 kc./s. frequency stable signal provided by the divider 20. This loop includes a variable frequency oscillator 134 which may be a variable capacity diode controlled oscillator, the output of which is applied to a counter 136. The counter may include a plurality of decade counting stages adapted to divide the frequency of the oscillator in 1 kc./s. steps. Thus, for example, the oscillator 134 may have a frequency which varies from 2 to 2.999 mc./s., and the counter may be adapted to divide that output by a number from 2000 to 2999 so as to derive an output frequency which is equal to 1 kc./s. The frequency dividing ratio interposed by the counter may be controlled by gating circuits connected in the counter which extracts the output signal. These gating circuits may be controlled by switches which are in turn controlled by knobs. These controls are indicated generally by the block labeled controls 138. The phase locked loop 132 also includes a phase detector 140 which provides an error signal to the VFO 134 by way of an amplifier and low pass filter stage 142. Accordingly, when the dividing ratio of the counter is changed, by means of the controls, the phase detector provides an error signal to change the frequency of the VFO 134 until it corresponds to the divising ratio of the counter. Accordingly, the VFO 134 in the illustrated embodiment is operative to provide an output signal which may be varied from 2.0 to 2.999 mc./s. in 1 kc./s. steps. This phase locked loop may also be termed as a pre-set divider synthesizer. Its output signal is passed through an isolation amplifier 144 into the second channel 82 of the synthesizer. It will be observed that the controls 138 may also be ganged to the controls of the other variable frequency oscillators used in the synthesizer such as the variable frequency oscillator 86.

The second channel 82 of the synthesizer also includes a third phase locked loop 146 which includes a variable frequency oscillator 148. This oscillator is a switched crystal variable frequency oscillator similar to the oscillator 86 used in the first channel phase locked loop 84. It may include five variable capacity diode crystal oscillators which are selectably switched into the loop by means of the ganged controls 138. These oscillators have frequencies of 24, 25, 26, 27 and 28 mc./s. respectively. The output of the variable frequency oscillator 148 is amplified in an amplifier 151, which may be a multistage amplifier, an intermediate, emitter/follower stage of which couples the output of the oscillator 148 to one input of a phase detector 150. This phase detector receives as another input the 1 mc./s. spectrum components produced by the spectrum generator 22, which is applied to the detector 150 by way of the amplifier 50. The phase detector 150 provides an error signal which is amplified and filtered in the stage 152 and locks the oscillator 148 to the corresponding spectrum frequency component (viz, 24, 25, 26, 27 or 28 mc./s.).

The second channel 82 also receives, as an input signal thereto, the 17 mc./s. signal which is extracted from the spectrum generator 22 by the filter 40 and a 455 kc./s. signal which is extracted from the 5 kc./s. spectrum by the filter 54. These signals are applied to a first mixer 154 by way of the isolation amplifier 38, in the case of the 17 mc./s. signal and an isolation amplifier 156 in the case of the 455 kc./s. signal. As will be ultimately observed, the 17 mc./s. signal is offset by the 455 mc./s. in the filter in order to provide the requisite output intermediate frequency (viz, 455 kc./s.). All of the other frequencies which are produced in the sythesizer, except for those produced by the preset counter phase locked loop 132, are all integral multiples of a megacycle. It will be observed that the preset counter phase locked loop 132 and the 455 kc./s. offset frequency are all integral submultiples of factors of 1 mc./s. All such signals are derived from the common frequency standard 10. Accordingly, the signals produced in the synthesizer remain coherent, notwithstanding translations in frequency. The 17 mc./s. input signal is utilized in order to provide a frequency compatible with the 2 to 2.999 mc./s. frequency produced by the preset counter phase locked loop 132. A higher frequency would not be compatible with the ultimate output frequency allowed by the synthesizer. A lower frequency would result in the spurious components within the pass band of the synthesizer system. Accordingly, while the 17 mc./s. signal is not exclusive, it is a feature of this synthesizer system to use a frequency in this range, inasmuch as it provides for successful operation over the wide band of frequencies with a minimum of translations and in which spurious components are absent.

The output of the mixer 154 is passed through a filter 158 tuned to 17.455 mc./s., which is the desired mixer product, and applied to an isolation amplifier 160. Another mixer 162 receives the preset counter phase locked loop output and the 17.455 mc./s. signal so as to provide a signal which may vary in frequency from 19.455 to 20.454 mc./s. The latter signal is extracted from the mixer output by means of a filter 164.

A third conversion is accomplished in a third mixer 166, which receives the third phase locked loop 146 output of 24, 25, 26, 27 or 28 mc./s. and the 19.455 to 20.454 mc./s. output by way of an isolation amplifier 168. This third mixer output is passed through another isolation amplifier 170 and in turn, alternately through either a 43.455 to 45.454 mc./s. filter 172 or a 45.455 to 48.454 mc./s. filter 174. Two filters are used for greater economy in covering such a wide frequency band. The switches 176 and 178, connected to the filters 174 and 175 may be ganged with the controls 138. The second channel output signal is derived from the filters by way of an isolation amplifier 180 and applied to the output mixer 130.

The output mixer 130 products are passed by way of an isolation amplifier 182 to an output phase locked loop 184 which contains a variable frequency oscillator 186, tuned by mechanical means (viz, selectively switching oscillator tank circuits of appropriate frequency) or by electrical means (viz, generating tuning voltages for application to a variable capacity diode in the oscillator 186) to approximately the desired frequency, hence the oscillator 186 is locked to the exact frequency produced by the output mixer 130. These exact frequencies which are available from the output mixer 130 may be selected, as heretofore mentioned, by the controls which are ganged to the variable frequency oscillators in the first channel phase locked loop 84 and the phase locked loop 146 in the second channel. The controls also select the proper 1 kc./s. frequency steps by setting the counter 136 in the present counter loop 132. The following table indicates the output frequencies which are obtained from the output mixer 130 for application to the output phase locked out. The latter output frequencies are ultimately provided by the phase locked loop 184 as the synthesizer system output frequency. The table also indicates which of the four intermediate frequency signals are provided at the output of the mixer 56 (viz. 455 kc./s., 1.455 mc./s., 6.455 mc./s. or 11.455 mc./s.). In the case of the third phase locked loop 146, it will be noted that the frequencies provided by the loop are successively selected to cover the indicated range. The first column of the table indicates the frequency range of received signals which are translated to a 455 kc./s. IF frequency by means of the synthesizer by the mixer group 58. It will be noted that the illustrated synthesizer and translation stage covers the frequency range from 2 to 75.999 mc./s., continuously in 1 kc./s. frequency steps. This range includes the high frequency band as well as a substantial portion of the very high frequency band. In the event that vernier tuning between the 1 kc./s. steps is desired, a manually tunable oscillator having a frequency adjustable about 17 mc./s. may be connected, in lieu of the output of the amplifier 38 to the mixer 154.

| System Frequency (mc.) | Intermediate Mixer 56 Output (mc.) | Mixer and Synthesizer Injection (Output of VFO 186) (mc.) | VFO 86 (mc.) | Filters 172 or 174 (Frequency of Signals Passing Therethrough) (mc.) | Loop 132 (mc.) |
|---|---|---|---|---|---|
| 2.000- 5.999 | .455 | 2.455- 6.45 | 41 | 43.455-47.454 | 24-27 |
| 6.000- 9.999 | 1.455 | 7.455-11.454 | 37 | 44.455-48.454 | 25-28 |
| 10.000-13.999 | 1.455 | 11.455-15.454 | 33 | 44.455-48.454 | 25-28 |
| 14.000-17.999 | 1.455 | 15.455-19.454 | 29 | 44.455-48.454 | 25-28 |
| 18.000-21.999 | 1.455 | 19.455-23.454 | 25 | 44.455-48.454 | 25-28 |
| 22.000-25.999 | 1.455 | 23.455-27.454 | 21 | 44.455-48.454 | 25-28 |
| 26.000-29.999 | 1.455 | 27.455-31.454 | 17 | 44.455-48.454 | 25-28 |
| 30.000-33.999 | 6.455 | 36.455-40.454 | 8 | 44.455-48.454 | 25-28 |
| 34.000-37.999 | 6.455 | 40.455-44.454 | 4 | 44.455-48.454 | 25-28 |
| 38.000-41.999 | 6.455 | 44.455-48.454 | ---------- | 44.455-48.454 | 25-28 |
| 42.000-45.999 | 6.455 | 48.455-52.454 | 4 | 44.455-48.454 | 25-28 |
| 46.000-49.999 | 6.455 | 52.455-56.454 | 8 | 44.455-48.454 | 25-28 |
| 50.000-53.999 | 11.455 | 61.455-65.454 | 17 | 44.455-48.454 | 25-28 |
| 54.000-57.999 | 11.455 | 65.455-69.454 | 21 | 44.455-48.454 | 25-28 |
| 58.000-61.999 | 11.455 | 69.455-73.454 | 25 | 44.455-48.454 | 25-28 |
| 62.000-65.999 | 11.455 | 73.455-77.454 | 29 | 44.455-48.454 | 25-28 |
| 66.000-69.999 | 11.455 | 77.455-81.454 | 33 | 44.455-48.454 | 25-28 |
| 70.000-73.999 | 11.455 | 81.455-85.454 | 37 | 44.455-48.454 | 25-28 |
| 74.000-75.999 | 11.455 | 85.455-87.454 | 41 | 44.455-46.454 | 25-26 |

Figure 4A:
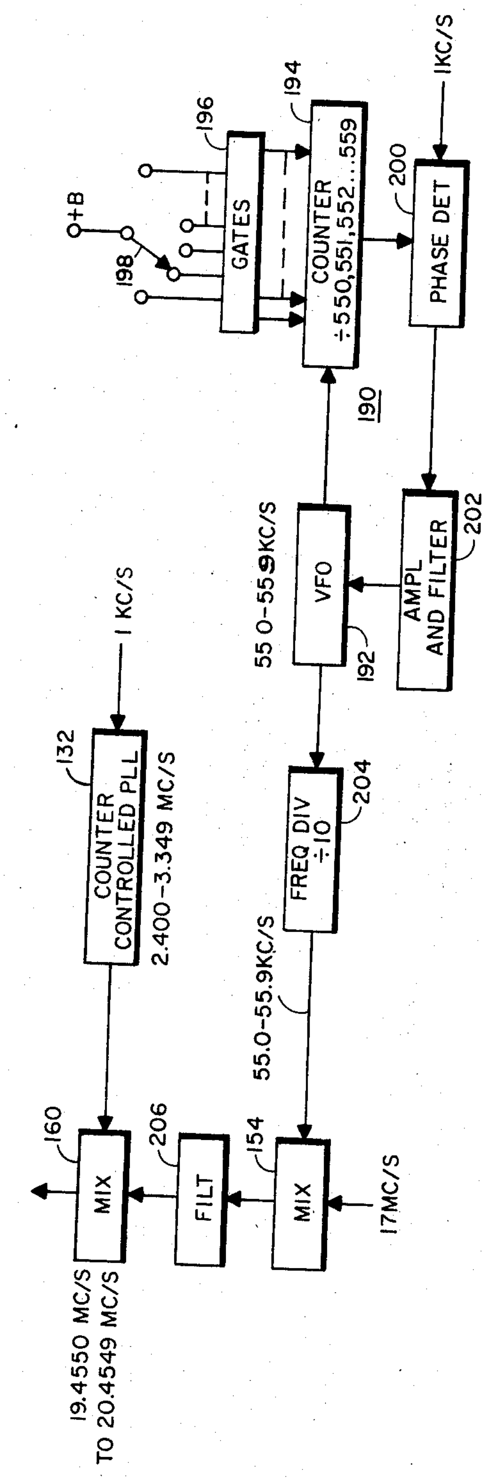
FIGS. 4*a* and 4*b* are block diagrams respectively illustrating portions of different embodiments of the synthesizer provided by the invention which provide frequency steps of 100 c./s. and 10 c./s., respectively.

In the event that it is desired to cover the frequency range in frequency steps smaller than 1 kc./s., another preset counter controlled phase locked loop similar to the loop 132 may be used. FIG. 4*a* illustrates the arrangement when frequency steps of 100 c./s. are desired. In lieu of a 455 kc./s. offset injection frequency, another preset counter control phase locked loop system 190 is used to develop an input frequency for the mixer 154. This loop 190 may include a variable capacity diode controlled variable frequency oscillator 192, having a frequency range from 550 to 559 kc./s. The output of the oscillator 192 is divided in a counter 194 which may divide by 550 to 559. The dividing ratio may be preset by means of gates 196, which control the transfer of pulses between stages of the counter. These gates may be enabled (selectively) by means of a switch 198 connected to a source of operating voltage at +B. This switch is connected to a knob for controlling the 100 c./s. steps of the frequency selected from the synthesizer. A phase detector 200 compares the frequency produced by the counter with a frequency of 1 kc./s. from the frequency divider 20 and provides an error signal, by way of the amplifying and filter stage 202, to lock the VFO to the selected frequency from 550 to 559 kc./s. In order to provide an output frequency which varies in 100 c./s. steps, a decade frequency divider which may be a decade counter 204 is used. Accordingly, the input to the mixer from the preset counter phase locked loop 190 varies from 55 to 55.9 kc./s. The mixer 154 produces an output signal which may vary from 17.055 to 17.0559 mc./s. which is extracted by means of a filter 206. The output of the filter is applied to the mixer 160, together with the output of the preset counter phase locked loop 132. The loop 132, however, is designed so as to provide an output frequency over the range from 2.4 to 3.399 mc./s. The latter may be accomplished by minor modifications in the counter 136. The mixer 160 thus provides output signals which vary from 19.4550 to 20.4549 mc./s. which may be varied in 100 c./s. steps. This output signal is thence applied to the filter 164 for use in the synthesizer in the manner heretofore described.

Figure 4B:
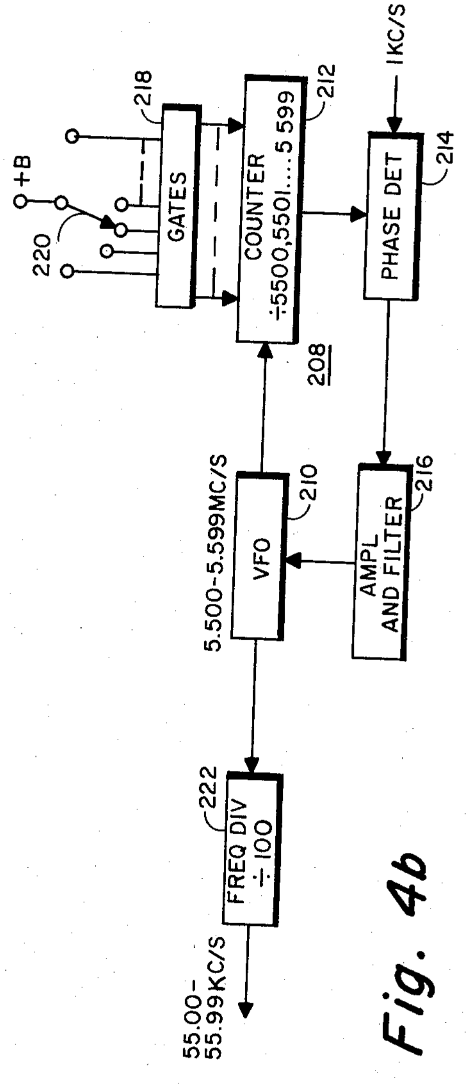

FIG. 4*b* illustrates the arrangement which may be used to provide an output frequency which varies in 10 c./s. steps. In FIG. 4*b*, a preset counter phase locked loop 208 is used, which may be similar to the loop 190 shown in FIG. 4*a* and includes a variable frequency oscillator 210, a counter 212, a phase detector 214, and an amplifier and filter 216. The oscillator 210 is designed to provide output frequencies which vary from 5.550 to 5.599 mc./s., and the counter is controlled by means of gates 218 and a 10 c./s. selector switch 220, to divide by 5,500 to 5,599, in integer steps (viz, 5500, 5501, 5502 . . . 5509). Accordingly, the output to the phase detector 214 will be a 1 kc./s. signal which is compared in the detector 214 with a 1 kc./s. signal derived from the frequency divider 20 so as to phase lock the oscillator 210. A frequency divider 222, which may divide the VFO output by 100 and may be two decade dividers connected in tandem, provides a range of signals which may vary from 55.00 to 55.99 mc./s. This signal may be applied to the mixer 154 and further translated as shown in FIG. 4*a*.

Returning again to FIG. 1, and specifically to the output phase locked loop, it will be noted that this loop includes, besides the VFO 186, a phase detector 224, an amplifier and filter stage 226 and a summing network 228. The summing network may be an operational amplifier having a plurality of inputs, one of which is the error voltage which comes from the amplifier and filter stage 226. The latter error voltage is derived from the phase detector which compares the VFO 186 output with the output from the output mixer 130. As was mentioned above, the VFO 186 is mechanically tuned by means of the controls 138 to the proper frequency range. Additional tuning may be provided by means of a tuning voltage generator (viz. a source of stable operating voltage controlled in amplitude by means of potentiometer and applied to a variable capacity diode in the oscillator). A hunting voltage generator 232 may also be provided in order to provide a tuning voltage which sweeps the VFO 186 over a band which will include the output frequencies from the output mixer 130. A phase detector may control the generator 232 to inhibit it when the VFO is within locking range of the output signal from the mixer 130. The output phase locked loop serves a dual function of a wide range filter which substantially automatically selects the proper frequency desired from the synthesizer.

Figure 3:
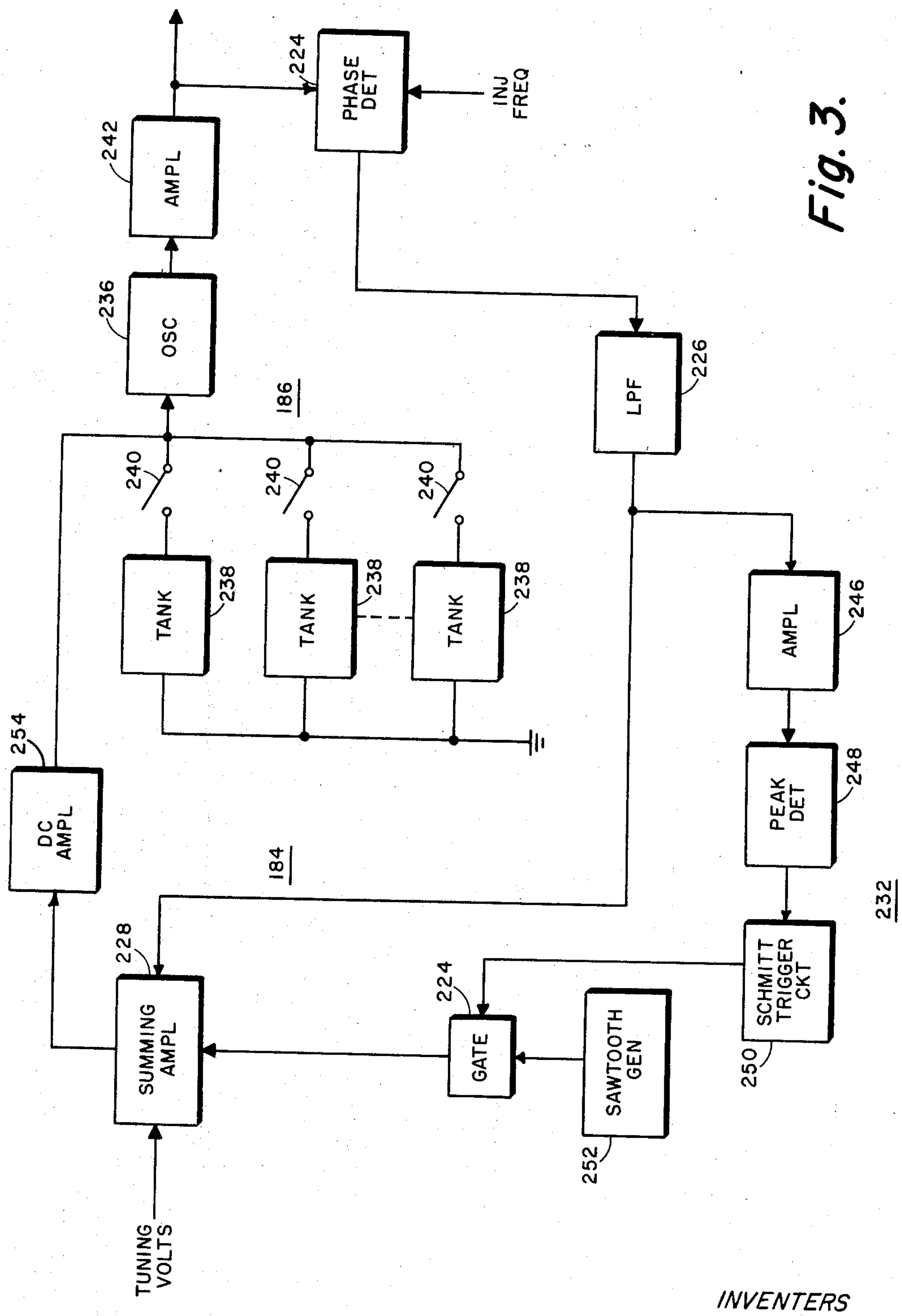
FIG. 3 is a block diagram which illustrates the output phase locked loop used in the synthesizer shown in FIG. 1.

The output phase locked loop 184 is shown in somewhat greater detail in FIG. 3. The variable frequency oscillator 186 contains an oscillator circuit which may be a Colpitts type oscillator 236 which has a variable capacity diode in its tank circuit. A plurality of tank circuits 238, are connected to the oscillators 236 by way of switches 240. Sixteen tank circuits may be provided which are selected by means of the controls 138 which operate the switches 240. For example, different selected tank circuits may be connected when the knobs, which control the 10 mc./s. and 1 mc./s. frequency steps, are in different positions. The output of the oscillator 236 is applied by way of an isolation amplifier 242 to the phase detector 224. This phase detector also receives the injection frequency from the output mixer 130 by way of the amplifier 182. A low pass filter 226 provides the error voltage to the summing amplifier 228. The hunting voltage generator 232 includes an amplifier 246 which applies the outputs of the low pass filter 226 to a peak detector 248. The amplifier may be an AC coupled amplifier, since the phase detector output will be an alternating current signal when the oscillator 236 is out of locking range of the injection frequency. The hunting voltage generator 232 will then, only when the VFO 186 is outside of the locking range, be operative to bring the VFO 186 back into locking range. The peak detector provides an output voltage which, when sufficiently high, triggers a Schmitt trigger circuit 250 which enables a gate 224. This gate couples the output of a sawtooth generator 252 to the summing amplifier 228. The amplifier 228 output is applied by way of a DC amplifier 254 to the variable capacity diode oscillator 236. During the time that the hunting voltage is being generated, the gate 224 is enabled by an output from the trigger circuit 250. When the trigger circuit 250 input voltage drops, it changes state, and inhibits the gate from passing the sawtooth voltage to the summing amplifier 228.

From the foregoing description it will be apparent that there has been provided an improved frequency synthesizer system which is continuously operative over an extremely wide frequency range. The synthesizer has the above-mentioned advantage of being relatively uncomplicated, notwithstanding the wide frequency range which it covers. In addition, the synthesizer system has the advantage of being readily miniaturized and may be packaged in an extremely small amount of space. The control arrangement also effects a saving in power by selecting only those circuits actually in use, thereby rendering the system especially suitable for mobile operation as in transceivers. It will be appreciated that the herein-described embodiment of the circuit, and particularly the specific frequencies and frequency ranges mentioned are principally illustrative, and that variations and modifications of the system within the scope of the invention will become apparent to those skilled in the art. Accordingly, the foregoing description should be taken as merely illustrative and not in any limiting sense.

What is claimed is:

1. A frequency synthesizer which produces signals phase coherent with signals from a frequency standard over a wide frequency band comprising (a) means responsive to a signal from said standard for producing frequency stable signals including a spectrum of such signals which are integrally related in frequency and a frequency stable signal of predetermined frequency above the lower end of said band, (b) a first channel responsive to said frequency stable signals for producing first output signals of selected frequencies, (c) said first channel including a first phase locked loop including (i) a first switched crystal variable frequency oscillator for producing said first output signals, and (ii) means responsive to said spectrum for locking said first oscillator so that said first channel output signals are phase coherent with said signals from said standard, (d) a second channel also responsive to said frequency stable signals and for producing second output signals of selected frequencies, (e) said second channel including means for applying said predetermined frequency stable signal at an input end of said second channel; a second phase locked loop including (i) a second variable frequency oscillator, (ii) means for selectively frequency dividing said second oscillator output in discrete frequency steps, and (iii) means responsive to said stable frequency signals for locking said second oscillator so that its said output signals are phase coherent with said signals from said standard; means responsive to said predetermined frequency stable signal for translating said second oscillator output upwardly in frequency; a third phase locked loop including (i) a third switched crystal variable frequency oscillator, and (ii) means responsive to said spectrum for locking said third oscillator so that said third oscillator output signals are phase coherent with said signals from said standard, means responsive to said translated second oscillator output for translating said third oscillator output upwardly in frequency to produce said second channel output signals, and (f) means for mixing said first and second channel output signals and producing said synthesizer output signals.

2. The invention as set forth in claim 1, for use in a double conversion radio having first and second mixer stages and means coupling the output of said first stage to the input of said second stage wherein means are provided for applying said synthesizer output signals to said first mixer and further means are provided responsive to said frequency stable signals for selectively applying different ones of said frequency stable signals to said second mixer stage.

3. The invention as set forth in claim 1, wherein said means for mixing said first and second channel output signals and producing said synthesizer output signals includes a mixer responsive to said first and said second channel output signals for producing a mixer output signal, an output phase locked loop comprising (i) a fourth variable frequency oscillator, (ii) a phase detector input coupled to said fourth oscillator and to said mixer output, said detector producing an error signal for locking said oscillator to said mixer output, and means also included in said loop for applying control signals to said fourth oscillator when said fourth oscillator produces a frequency out of the locking range of said error signal.

4. The invention as set forth in claim 3, wherein common frequency selection controls are coupled to said output phase locked loop variable frequency oscillator, said first and third variable frequency oscillators and said second phase locked loop frequency dividing means, said output loop and first and third variable frequency oscillators each having a plurality of different frequency determining circuits, and switch means for selectively connecting said circuits coupled to said controls.

5. The invention as set forth in claim 4, wherein output phase locked loop variable frequency oscillation frequency determining circuits include a plurality of tank circuits, each tuned to a different frequency.

6. The invention as set forth in claim 4, wherein said first oscillator comprises a plurality of oscillator circuits, each including a crystal tuned to a different frequency and a voltage variable reactive element for varying the frequency thereof, and wherein said switch means is coupled to said oscillator circuits for selectively connecting different ones thereof in said first channel phase locked loop.

7. The invention as set forth in claim 1 wherein said second channel includes a mixer responsive to said predetermined frequency stable signal and another frequency stable signal of different frequency than said predetermined frequency for deriving a first intermediate output signal, and wherein said means responsive to said predetermined frequency stable signal for translating said second oscillator upwardly in frequency includes another mixer circuit responsive to said second variable frequency oscillator output signal and said first intermediate output signal for producing said translated second oscillator output signal.

8. The invention as set forth in claim 1, wherein said second phase locked loop comprises said variable frequency oscillator, a variable count counter coupled to said second variable frequency oscillator for dividing the output frequency of said second variable frequency oscillator in integral frequency steps, control means coupled to said counter for selecting said steps, a phase detector responsive to said counter output and to one of said frequency stable signals for producing an error signal, means for applying said error signal to said second variable frequency oscillator for controlling the frequency thereof, a frequency divider coupled to said second variable frequency oscillator for dividing the frequency output thereof by a predetermined ratio, a mixer responsive to the output of said divider and said predetermined frequency stable signals for providing first intermediate frequency signals, another mixer responsive to said intermediate frequency signal and to the output of said third variable frequency oscillator for providing a second intermediate frequency signal, and means responsive to said second intermediate frequency signal for generating said second channel output signal.

9. The invention as set forth in claim 1 wherein said means for generating said frequency stable signals includes a chain of tandem connected frequency dividers, the first of which is connected to said standard, a plurality of spectrum generators coupled to the outputs of different ones of said dividers, and filtering means coupled to one of said spectrum generator outputs for deriving said frequency stable signal of predetermined frequency.

References Cited

UNITED STATES PATENTS

| | | | |
|---|---|---|---|
| 3,229,219 | 1/1966 | Berman | 331—2 |
| 3,319,178 | 5/1967 | Broadhead | 331—2 |

OTHER REFERENCES

Colodner: Electronic Design, "Frequency Synthesis Adds Versatility to Stability," pp. 124–127.

JOHN KOMINSKI, *Primary Examiner.*